United States Patent
Iftime et al.

(10) Patent No.: US 9,404,001 B2
(45) Date of Patent: Aug. 2, 2016

(54) PHOTOCHROMIC LATEX INK

(71) Applicant: XEROX CORPORATION, Norwalk, CT (US)

(72) Inventors: Gabriel Iftime, Ontario (CA); Jennifer L. Belelie, Ontario (CA); Paul F. Smith, Ontario (CA); Adela Goredema, Ontario (CA)

(73) Assignee: XEROX CORPORATION, Norwalk, CT (US)

( * ) Notice: Subject to any disclaimer, the term of this patent is extended or adjusted under 35 U.S.C. 154(b) by 103 days.

(21) Appl. No.: 14/093,390

(22) Filed: Nov. 29, 2013

(65) Prior Publication Data

US 2015/0153479 A1 Jun. 4, 2015

(51) Int. Cl.

| | |
|---|---|
| G02B 5/23 | (2006.01) |
| C09D 11/50 | (2014.01) |
| C09D 11/32 | (2014.01) |
| G01D 11/00 | (2006.01) |
| B32B 15/02 | (2006.01) |
| B32B 17/02 | (2006.01) |
| B32B 19/00 | (2006.01) |
| B32B 21/02 | (2006.01) |
| B32B 23/02 | (2006.01) |
| B32B 27/02 | (2006.01) |
| B32B 5/16 | (2006.01) |
| B32B 9/00 | (2006.01) |

(52) U.S. Cl.
CPC ............... *C09D 11/50* (2013.01); *C09D 11/32* (2013.01); *Y10T 428/2982* (2015.01)

(58) Field of Classification Search
USPC .......... 252/586; 427/145, 160; 428/327, 407, 428/402; 503/200, 201, 218, 223; 524/84; 528/185; 347/100, 110
See application file for complete search history.

(56) References Cited

U.S. PATENT DOCUMENTS

| | | |
|---|---|---|
| 5,551,973 A | 9/1996 | Olivier |
| 7,708,396 B2 | 5/2010 | Iftime |
| 8,287,963 B2 | 10/2012 | Iftime et al. |
| 8,303,858 B2 | 11/2012 | Morimitsu |
| 8,304,076 B2 | 11/2012 | Norsten |
| 2007/0211110 A1 | 9/2007 | Iftime |
| 2007/0211124 A1* | 9/2007 | Iftime et al. ............ 347/100 |
| 2010/0086768 A1* | 4/2010 | Norsten et al. ............ 428/327 |
| 2012/0038718 A1* | 2/2012 | Kazmaier ............ C09D 11/50 347/86 |
| 2013/0305947 A1 | 11/2013 | Iftime |

OTHER PUBLICATIONS

G. J. Smets, J. Thoen, and A. Aerts, Some Photochemical Reactions in Solid Polymer Systems, J. Polymer Sci.: Symposium No. 51. 119-134 (1975). © 1975 by John Wiley & Sons, Inc.*

* cited by examiner

*Primary Examiner* — Bijan Ahvazi
(74) *Attorney, Agent, or Firm* — Shimokaji IP

(57) ABSTRACT

A photochromic latex ink includes an organic polymer; optionally a colorant, and a photochromic compound. The photochromic ink composition has an average particle size from about 20 nm to about 600 nm. The photochromic ink composition is capable of reversibly converting from a first color to a second color in response to a predetermined wavelength scope.

20 Claims, No Drawings

PHOTOCHROMIC LATEX INK

TECHNICAL FIELD

This disclosure is generally directed to ink compositions for printing processes. More specifically, this disclosure is directed to an aqueous latex ink composition which provides a reversible color change when exposed to UV light, such as sunlight or UV black light, and methods of producing such ink compositions.

BACKGROUND

The phenomenon of photochromism is the property of a chemical compound to reversibly change its visible light absorption spectrum from a first color to a second color when exposed to an energy radiation of a certain wavelength or wavelength range. The energy radiation, as well as the changes in the absorption spectra, is usually in the ultraviolet, visible, or infrared regions. Sometimes, the change in one direction is thermally induced.

The technical and commercial interest in photochromic compounds and compositions including photochromic compounds have increased considerably. Numerous photochromic compounds have been synthesized for ophthalmic lenses, optical data storage, sunglasses, copying devices, security marks on documents, and holography.

Photochromic phenomena are observed in both organic compounds, such as anils, disulfoxides, hydrazones, oxazones, semicarbazones, stilbene derivatives, o-nitrobenzyl derivatives, spiro compounds, and in inorganic compounds, such as metal oxides, alkaline earth metal sulfides, titanates, mercury compounds, copper compounds, minerals, and transition metal compounds such as carbonyls.

Unfortunately, to date, photochromic compounds found only relatively limited usefulness for printing purposes. This seems to be due to the fact that photochromic compounds are generally highly reactive and normally undergo chemical and photochemical changes in the complex medium of printing inks.

There is a need for printing inks useful for printing documents to carry marks normally invisible to the human eye but which become visible after exposure to an activating radiation, especially, for example, for producing security documents to detect or prevent forgery or counterfeiting; producing special patterns, text or pictures; for producing security printing of packages and labels; or for using prints as sensing "devices" for detecting product overexposure due to undesired conditions (e.g., over accepted threshold temperature or sunlight).

There remains a need for a printing ink that reversibly changes color when exposed to UV light such as sunlight or UV black light, and methods of producing such ink compositions.

SUMMARY

The following detailed description is of the best currently contemplated modes of carrying out exemplary embodiments herein. The description is not to be taken in a limiting sense, but is made merely for the purpose of illustrating the general principles of the disclosure herein, since the scope of the disclosure herein is best defined by the appended claims.

Various inventive features are described below that can each be used independently of one another or in combination with other features.

Broadly, embodiments of the disclosure herein generally provide a photochromic latex particle comprising an organic polymer; optionally a colorant; and a photochromic compound; wherein the photochromic latex particle has a particle size from about 20 nm to about 600 nm.

In another aspect of the disclosure herein, a photochromic latex ink composition comprises an organic polymer; optionally a colorant; and a carrier; wherein, at a jetting temperature from about 25° C. to about 70° C., the photochromic latex ink composition has a surface tension from about 15 mN/m to about 50 mN/m.

In yet another aspect of the disclosure herein, a photochromic latex ink composition comprises an organic polymer; optionally a colorant; and a carrier; wherein, at a jetting temperature from about 25° C. to about 70° C., the photochromic latex ink composition has a viscosity from about 2 cPs to about 20 cPs.

DETAILED DESCRIPTION

In the present disclosure, the term "photochromic compound" refers to a compound that reversibly changes color induced in one or both directions after exposure to an energy radiation source of a certain wavelength or wavelength range. The energy radiation, as well as the changes in the absorption spectra, is usually in the ultraviolet, visible, or infrared regions. The reversible reaction may occur, for example, thermally or by absorption of light.

In the present disclosure, the term "color" refers to the absorption by an object of light wavelengths on the electromagnetic spectrum. The color must be reversible and should last for a time period. Reversibility, i.e. color cancellation, may be accelerated by heating or by exposure to a wavelength radiation different from that of the first coloration.

In the present disclosure, the term "ambient temperature" refers to a temperature ranging from about 15 to about 30 degrees C.

In the present disclosure, the term "optional" refers to instances in which a subsequently described circumstance may or may not occur, and include instances in which the circumstance occurs and instances in which the circumstance does not occur.

In the present disclosure, the term "at least one" refers to instances in which one of the subsequently described circumstances occurs, and to instances in which more than one of the subsequently described circumstances occurs.

In the present disclosure, the term "printing image" refers to any marking that a person wishes to view where the "image" can be, for example, words, a picture, graphics, or a combination thereof.

The present disclosure provides a photochromic latex ink composition to produce printing images on a substrate that reversibly changes color when exposed to UV light, such as sunlight or UV black light, and methods of producing such ink compositions. In one embodiment, the printing images are colorless when examined indoor (room light) but become colored when viewed with UV light including sunlight. In another embodiment, the printing images may change from a permanent color (in room light) to a new color when exposed to UV light. With an appropriate second activation these printing images can reverse to the original color. The color reversing time may be tuned to a range comprised from a few seconds to minutes, days or weeks. The photochromic latex ink composition may be reversed back by exposure to visible light or by heating above the room temperature.

The photochromic latex ink of the present disclosure may contain latex particles including an organic polymer, optionally a colorant such as a dye or pigment, and a photochromic dye. The latex particles can be dispersed in a carrier which may include at least one of water, a viscosity control additive, a humectant, and a surfactant.

Latex Particle Production

Although embodiments relating to the latex particle production are described below with respect to an emulsion process, any suitable method of preparing latex particles may be used, including dispersion, seeded polymerization, aggregation, and chemical processes, such as suspension.

When using an emulsion process, the latex particles may be prepared without a core/shell configuration by mixing a surfactant solution and deionized water in a stainless steel holding tank to form an aqueous surfactant phase, and then adding ammonium hydroxide to the surfactant phase solution. Separately, an organic mixture including a photochromic dye, optionally a dye, a binder, and a solvent is heated. The organic mixture is slowly added to the surfactant solution while adjusting the speed of the homogenizer to obtain optimal homogenization. Once all the organic mixture is charged into the surfactant solution, the temperature is held at 80° C. for an additional 2 hours to complete the reaction. Full cooling is then applied and the temperature is reduced to 35° C. The latex particles are then separately dried.

Latex Particles

The latex particles may have any suitable configuration, for example, a core and at least one shell. A photochromic material may be present in the core, in the shell, or in both. The shell configuration may offer benefits over latex particles having no shell. The shell may protect the photochromic material located on the core from undesired coloration by preventing UV light from the ambient light. In addition, the shell material may be tuned to allow only selected wavelengths to reach the photochromic material. Therefore, the photochromic material can be activated only by these selected wavelengths. This can be customized and represent a suitable security feature on a printed substrate. Control of selected active wavelengths is achieved by appropriately selecting light absorbing materials incorporated into shell. Materials can be tuned to absorb incident light at all wavelengths except for selected "active" wavelengths.

Furthermore, the shell may provide improved mechanical properties such as robustness against scratching or rubbing.

In addition, the shell may provide improved particle dispersibility in the ink vehicle, while not affecting the photochromic behavior of the ink.

In one embodiment, the shell is a single shell and the photochromic compound is present in the core and the colorant is present in the single shell. The core/single shell latex emulsion comprised of organic polymer particles containing a photochromic compound and colorants generated from the emulsion polymerization can be prepared, for example, as follows. A surfactant and deionized water are mixed in a stainless steel holding tank to form the aqueous surfactant phase. The holding tank is then purged with nitrogen before transferring into the reactor. The reactor is then continuously purged with nitrogen while being stirred at 100 RPM. The reactor is then heated up to 80° C. at a controlled rate, and held there. Separately, a solution of ammonium persulfate initiator and deionized water is prepared. Separately, a first emulsion is prepared including an organic polymer, a surfactant, deionized water, and a photochromic compound. A second emulsion for the shell is prepared including a second organic polymer, a surfactant, deionized water, and a colorant. A portion of the first emulsion is slowly fed into the reactor containing the second emulsion at 80° C. to form the "seeds" while being purged with nitrogen. The first emulsion is then slowly charged into the reactor and after 10 minutes the rest of the first emulsion is continuously fed in a using metering pump at a rate of 0.5 g/min. Once all the first emulsion is charged into the main reactor, the second emulsion is continuously fed in using a metering pump at a rate of 0.5 g/min. Once all the second emulsion is charged into the main reactor, the temperature is held at 80° C. for an additional 2 hours to complete the reaction. Full cooling is then applied and the reactor temperature is reduced to 35° C. The latex particles are then separately dried.

In other embodiments, the shell comprises an outer shell and an inner shell, and the photochromic compound is present in the core or the inner shell, or in both the core and the inner shell, and the colorant is present in the outer shell. The core/inner-shell/outer-shell latex emulsion comprised of polymer particles containing photochromic compound and colorant generated from the emulsion polymerization can be prepared as follows. A surfactant and deionized water are mixed in a stainless steel holding tank to form the aqueous surfactant phase. The holding tank is then purged with nitrogen before transferring into the reactor. The reactor is then continuously purged with nitrogen while being stirred at 100 RPM. The reactor is then heated up to 80° C. at a controlled rate, and held there. Separately, a solution of ammonium persulfate initiator and de-ionized water is prepared. Separately, a first monomer emulsion is prepared including an organic polymer, surfactant, and deionized water. A second "inner shell" monomer solution is prepared including an organic polymer, a surfactant, deionized water, and a photochromic compound. A third "outer shell" monomer solution is prepared including methyl methacrylate, a surfactant, deionized water, and a colorant. 10% by weight of the first monomer solution is slowly fed into the reactor containing the aqueous surfactant phase at 80° C. to form the "seeds" while being purged with nitrogen. The first emulsion is then slowly charged into the reactor and after 10 minutes the rest of the first monomer emulsion is continuously fed in using a metering pump at a rate of 0.5 g/min. Once all the first monomer emulsion is charged into the main reactor, the second "inner shell" monomer emulsion is continuously fed in using a metering pump at a rate of 0.5%/min. Once all the second "inner shell" monomer emulsion is charged into the main reactor, the third "outer shell" monomer emulsion is continuously fed in using a metering pump at a rate of 0.5 g/min. Once all the third "outer shell" monomer emulsion is charged into the main reactor the temperature is held at 80° C. for an additional 2 hours to complete the reaction. Full cooling is then applied and the reactor temperature is reduced to 35° C. The latex particles are then separately dried.

In further embodiments, the particles lack a core/shell configuration where the photochromic compound and the dye are simply dispersed in the binder. A photochromic latex particle may include an organic polymer; optionally a colorant; and a photochromic compound.

Organic Polymer

Typically, latex particles are made of a polymer base such as styrene acrylate copolymers. Other polymer base materials include polyester resins. Exemplary organic polymers include styrene acrylates, styrene butadienes, styrene methacrylates, and more specifically, poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene- 1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonotrile), poly(styrene-butyl acrylate-acrylonitrile-acrylic acid), poly(styrene-butadiene), poly(styrene-isoprene), poly(styrene-butyl methacrylate), poly(styrene-butyl acrylate-acrylic acid), poly(styrene-butyl methacrylate-acrylic acid), poly(butyl methacrylate-butyl acrylate), poly(butyl methacrylate-acrylic acid), poly(acrylonitrile-butyl acrylate-acrylic acid), and combinations thereof. The polymer may be block, random, or alternating copolymers.

The concentration of the organic polymer present in the particle core or inner shell or both the core and the inner shell can be from about 0.1 to about 90 weight percent, or from about 1 to about 70% weight percent, or from about 2 to about 5 weight percent of the printing ink.

Photochromic Compound

The photochromic compound can change its color from a first color (including colorless) to a second color when exposed to UV light. The photochromic compound generally comprises a ring closure or ring opening in the molecule with the formation of conjugated double bonds; ionic mechanisms are generally involved in these reactions.

Examples of suitable photochromic compounds include compounds that undergo heterolytic cleavage, such as spiropyrans and related compounds, and the like; compounds that undergo homolytic cleavage, such as bis-imidazole compounds, bis-tetraphenylpyrrole, hydrazine compounds, aryl disulfide compounds, and the like; compounds that undergo cis-trans isomerization, such as stilbene compounds, photoisomerizable azo compounds, and the like; compounds that undergo photochromic tautomerism, including those that undergo hydrogen transfer phototautomerism, those that undergo photochromic valence tautomerism, and the like; and others. Mixtures of two or more photochromic compounds may be used together in any suitable ratio.

In embodiments, the photochromic compound may be composed of one, two, three or more different types of photochromic compounds, where the term "type" refers to a family of reversibly interconvertible forms, e.g., spiropyran and its isomer merocyanine collectively forming one type (also referred to as one family) of photochromic compound. Unless otherwise noted, the term "photochromic compound" refers to all molecules of the photochromic compound regardless of form. For example, where the photochromic compound is of a single type, such as spiropyran/merocyanine, at any given moment the molecules of the photochromic compound may be entirely spiropyran, entirely merocyanine, or a mixture of spiropyran and merocyanine. In embodiments, for one type of photochromic compound, one form is colorless or weakly colored (collectively referred herein as "less colored") and the other form is differently colored (also referred herein as "different color" or "more colored").

The concentration of the photochromic compound present in the particle core or inner shell or both the core and the inner shell can be from about 0.01 to about 50 weight percent, or from about 0.1 to about 40% weight percent, or from about 1 to about 10 weight percent of the printing ink.

Specific examples of photochromic compounds include spiropyrans, for example of the general formula:

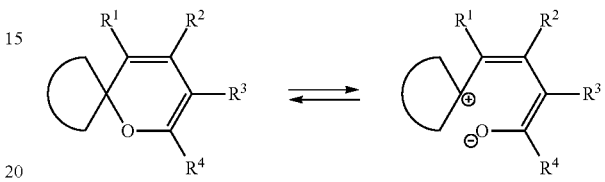

wherein $R^1$, $R^2$, $R^3$, and $R^4$ each, independently of the others, may be hydrogen; alkyl groups, including cyclic alkyl groups, such as cyclopropyl, cyclohexyl, and the like; and including unsaturated alkyl groups, such as vinyl ($H_2C=CH-$), allyl ($H_2C=CH-CH_2-$), propynyl ($HC\equiv C-CH_2-$), and alkyl groups having from 1 to about 50 carbon atoms and from 1 to about 30 carbon atoms; aryl groups having from about 5 to about 30 carbon atoms, for example, from about 5 to about 20 carbon atoms; arylalkyl groups having from about 6 to about 50 carbon atoms, for example, from about 6 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups having from 1 to about 50 carbon atoms, for example, from 1 to about 30 carbon atoms; aryloxy groups having from about 5 to about 30 carbon atoms, for example, from about 5 to about 20 carbon atoms; alkylthio groups having from 1 to about 50 carbon atoms, for example, from 1 to about 30 carbon atoms; arylthio groups having from about 5 to about 30 carbon atoms, for example, from, about 5 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups having from 1 to about 20 carbon atoms, for example, from 1 to about 10 carbon atoms; aryloxy groups having from about 5 to about 20 carbon atoms, for example, from about 5 to about 10 carbon atoms; alkylthio groups having from 1 to about 20 carbon atoms, for example, from 1 to about 10 carbon atoms; arylthio groups having from about 5 to about 20 carbon atoms, for example, from about 5 to about 10 carbon atoms; aldehyde groups; ketone groups; ester groups; amide groups; carboxylic acid groups; sulfonic acid groups; and the like. Further, two or more R groups can be joined together to form a ring.

Examples of spiropyrans include spiro[2H-1-benzopyran-2,2'-indolines], including those of the general formula:

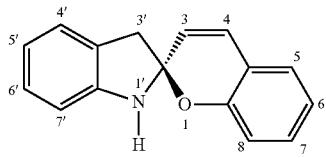

wherein substituents can be present on one or more of the 1', 3', 4', 5', 6', 7', 3, 4, 5, 6, 7, and 8 positions; spiroindolinonaphthopyrans, including those of the general formula:

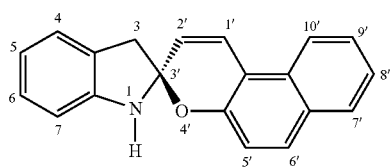

wherein substituents can be present on one or more of the 1, 3, 4, 5, 6, 7, 1', 2', 5', 6', 7', 8', 9', or 10' positions; spiro[2H-1-benzopyran-2,2'benzothiazolines], including those of the general formula:

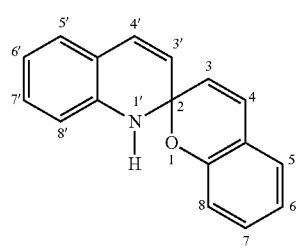

wherein substituents can be present on one or more of the 1', 3', 4', 5', 6', 7', 8', 3, 4, 5, 6, 7, and 8 positions; spiro[2H-1-benzopyran-2,2'-benzoxazolines], including those of the general formula:

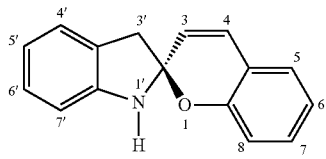

wherein substituents can be present on one or more of the 1', 3', 4', 5', 6', 7', 3, 4, 5, 6, 7, and 8 positions; spiropyranopyrans, including those of the general formula:

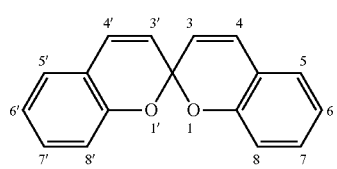

wherein substituents can be present on one or more of the 3, 4, 5, 6, 7, 8, 3', 4', 5', 6', 7', and 8' positions; aza-spiroindolinopyrans, including those of the general formula:

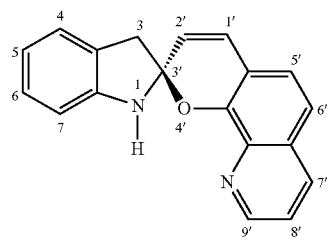

wherein substituents can be present on one or more of the 3, 4, 5, 6, 7, 3', 4', 5', 6', 7', 8', and 9' positions; spiro(quinolinopyrans), including those of the general formula:

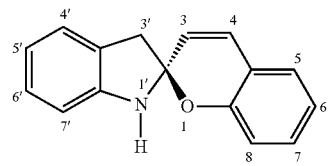

wherein substituents can be present on one or more of the 3, 4, 5, 6, 7, 8, 3', 4', 5', 6', 7', and 8' positions; spiro(pyridino pyrans), including those of the general formula:

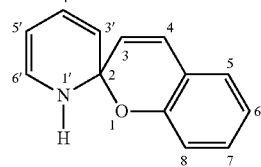

wherein substituents can be present on one or more of the 3, 4, 5, 6, 7, 8, 3', 4', 5', and 6' positions, and the like.

Also suitable are spirooxazines, for example of the general formula:

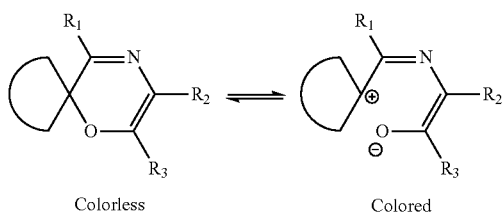

wherein $R^1$, $R^2$, and $R^3$ each, independently of the others, may be hydrogen; alkyl groups, including cyclic alkyl groups, such as cyclopropyl, cyclohexyl, and the like; and including unsaturated alkyl groups, such as vinyl ($H_2C$=$CH$—), allyl ($H_2C$=$CH$—$CH_2$—), propynyl ($HC$≡$C$—$CH_2$—), and the like, for example alkyl groups having from 1 to about 50 carbon atoms, such as from 1 to about 30 carbon atoms; aryl groups having, for example from about 5 to about 30 carbon atoms, such as from about 5 to about 20 carbon atoms; arylalkyl groups having, for example, from about 6 to about 50 carbon atoms, for example from about 6 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups having for example, from 1 to about 50 carbon atoms, such as from 1 to about 30 carbon atoms; aryloxy groups having, for example, from about 5 to about 30 carbon atoms, such as from about 5 to about 20 carbon atoms; alkylthio groups having for example, from 1 to about 50 carbon atoms, such as from 1 to about 30 carbon atoms; arylthio groups having, for example, from about 5 to about 30 carbon atoms, from about 5 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride, chloride, bromide, iodide, and astatide; amine groups; including primary, secondary, and tertiary amines; hydroxy groups; alkoxy groups having, for example, from 1 to about 20 carbon atoms, such as from 1 to about 10 carbon atoms; aryloxy groups having, for example, from about 5 to about 20 carbon atoms, such as from about 5 to about 10 carbon atoms; alkylthio groups having, for example, from 1 to about 20 carbon atoms such as from 1 to about 10 carbon atoms; arylthio groups having, for example, from about 5 to about 20 carbon atoms, such as from about 5 to about 10 carbon atoms; aldehyde groups; ketone groups; ester groups; amide groups; carboxylic acid groups; sulfonic acid groups; and the like. Further, two or more R groups can be joined together to form a ring.

Examples of spirooxazines include spiro[indoline-2,3'-[3H]-naphtho[2,1-b]-1,4-oxazines], including those of the general formula:

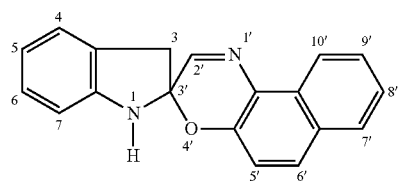

wherein substituents can be present on one or more of the 1, 3, 4, 5, 6, 7, 1', 2', 5', 6', 7', 8', 9', or 10' positions; spiro[2H-1,4-benzoxazine-2,2'-indolines including those of the general formula:

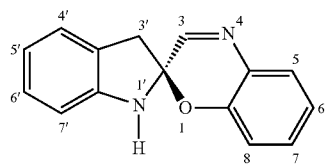

wherein substituents can be present on one or more of the 3, 5, 6, 7, 8, 1', 3', 4', 5', 6', and 7' positions.

As an example of the photochromism exhibited by spiro compounds, the following reaction scheme illustrates the transformation upon exposure to activating radiation, in this case UV light. The closed form of a spirooxazine compound is shown on the left. This form has no color. However, upon exposure to UV light, the open form of the compound, shown on the right, is generated. This form exhibits a color, unlike the form on the left. Thus, in a colored ink, the colored form of the spirooxazine following exposure to UV light will alter the color exhibited by the colored ink containing the photochromic compound. Upon exposure to visible light, for example sun light or room light (incandescent light), the open form can revert to the closed form.

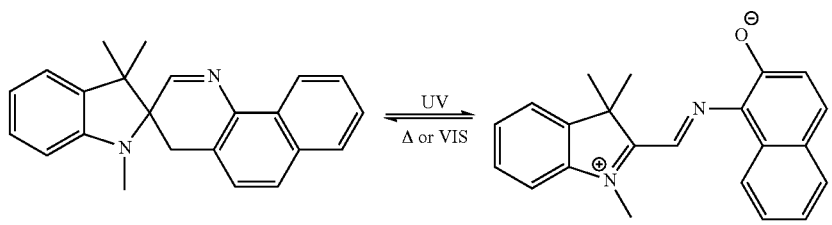

Also suitable as a photochromic compound are spirothiopyrans, of the general formula:

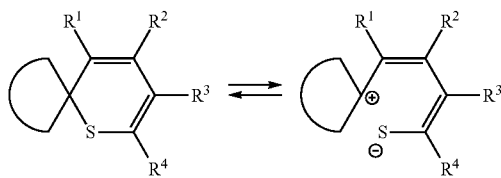

wherein $R^1$, $R^2$, $R^3$, and $R^4$ each, independently of the others, may be hydrogen; alkyl groups, including cyclic alkyl groups, such as cyclopropyl, cyclohexyl, and the like; and including unsaturated alkyl groups, such as vinyl ($H_2C=CH-$), allyl ($H_2C=CH-CH_2-$), propynyl ($HC\equiv C-CH_2-$), and the like, the alkyl groups having from 1 to about 50 carbon atoms, such as from 1 to about 30 carbon atoms; aryl groups having from about 5 to about 30 carbon atoms, for example, from about 5 to about 20 carbon atoms; arylalkyl groups having from about 6 to about 50 carbon atoms, for example, from about 6 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups having from 1 to about 50 carbon atoms, for example, from 1 to about 30 carbon atoms; aryloxy groups having from about 5 to about 30 carbon atoms, for example, from about 5 to about 20 carbon atoms; alkylthio groups having from 1 to about 50 carbon atoms, for example, from 1 to about 30 carbon atoms; arylthio groups having from about 5 to about 30 carbon atoms, for example, from about 5 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups having from 1 to about 20 carbon atoms, for example, from 1 to about 10 carbon atoms; aryloxy groups having from about 5 to about 20 carbon atoms, for example, from about 5 to about 10 carbon atoms; alkylthio groups having from 1 to about 20 carbon atoms, for example, from 1 to about 10 carbon atoms; arylthio groups having from about 5 to about 20 carbon atoms, for example, from about 5 to about 10 carbon atoms; aldehyde groups; ketone groups; ester groups; amide groups; carboxylic acid groups; sulfonic acid groups; and the like. Further, two or more R groups can be joined together to form a ring.

Examples of spirothiopyrans include spiro[2H-1-benzothiopyran-2,2'-indolines], including those of the general formula:

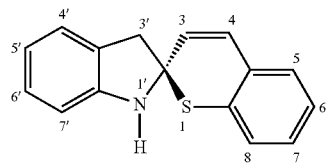

wherein substituents can be present on one or more of the 1', 3', 4', 5', 6', 7', 3, 4, 5, 6, 7, and 8 positions, and the like.

Substituents on the left ring of the spiropyrans, spirooxazines, and spirothiopyrans (represented by the loop in the generic structural formulas of these materials) can be adjusted to affect the color of the open form of the material. Substituents on the central moiety of the spiropyrans, spirooxazines, and spirothiopyrans or on alkyl or aryl groups attached thereto may also affect the color of the open form of the material, although to a lesser degree than substituents on the left ring. Further, when the left ring contains a nitrogen atom, this atom or other atoms may be substituted to affect the solubility of the compound in various liquids and resins. For example, long chain hydrocarbons, such as those with 16 or 18 carbon atoms, can increase solubility in hydrocarbons. Sulfonate and carboxylate groups, for example, can enhance water solubility. Specific examples of the aforementioned spiropyrans, spirooxazines, and spirothiopyrans are described in U.S. Pat. No. 5,593,486, incorporated herein by reference in its entirety.

As additional photochromic compounds, stilbene compounds, aromatic azo compounds, bisimidazoles, hydrazines, aryl disulfides, and mixtures thereof may also be used.

Stilbene compounds may be of the general formula:

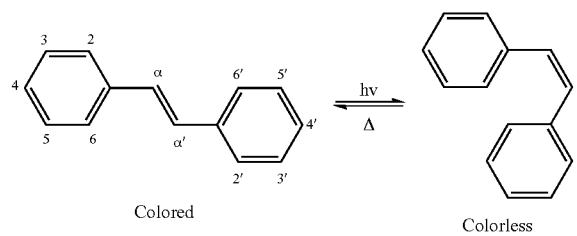

wherein substituents may be present at the 2, 3, 4, 5, 6, 2', 3', 4', 5' and 6' positions. Examples of suitable substituents include hydrogen; alkyl groups, including cyclic alkyl groups, such as cyclopropyl, cyclohexyl, and the like; and including unsaturated alkyl groups, such as vinyl ($H_2C=CH-$), allyl ($H_2C=CH-CH_2-$), propynyl ($HC\equiv C-CH_2-$), and the like, and alkyl groups having from 1 to about 50 carbon atoms, such as from 1 to about 30 carbon atoms; aryl groups having from about 5 to about 30 carbon atoms, for example, from about 5 to about 20 carbon atoms; arylalkyl groups having from about 6 to about 50 carbon atoms, for example, from about 6 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups having from 1 to about 50 carbon atoms, for example, from 1 to about 30 carbon atoms; aryloxy groups having from about 5 to about 30 carbon atoms, for example, from about 5 to about 20 carbon atoms; alkylthio groups having from 1 to about 50 carbon atoms, for example, from 1 to about 30 carbon atoms; arylthio groups having from about 5 to about 30 carbon atoms, for example, from about 5 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride, chloride, bromide, iodide, and astatide; amine groups; including primary, secondary, and tertiary amines; hydroxy groups; alkoxy groups having from 1 to about 20 carbon atoms, for example, from 1 to about 10 carbon atoms; aryloxy groups having from about 5 to about 20 carbon atoms, for example, from about 5 to about 10 carbon atoms; alkylthio groups having from 1 to about 20 carbon atoms, for example, from 1 to about 10 carbon atoms; arylthio groups having from about 5 to about 20 carbon atoms, for example, from about 5 to about 10 carbon atoms; aldehyde groups; ketone groups; ester groups; amide groups; carboxylic acid groups; sulfonic acid groups; and the like. Further, two or more R groups can be joined together to form a ring.

Aromatic azo compounds that exhibit photochromism may be of the general formula:

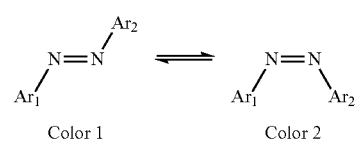

wherein $Ar_1$ and $Ar_2$ are each, independently of the other, aromatic groups. The aromatic groups can be substituted, with examples of substituents including hydrogen; alkyl groups, including cyclic alkyl groups, such as cyclopropyl, cyclohexyl, and the like; and including unsaturated alkyl groups, such as vinyl ($H_2C=CH-$); allyl ($H_2C=CH-CH_2-$); propynyl ($HC\equiv C-CH_2-$); and the like, and alkyl groups having from 1 to about 50 carbon atoms, such as from 1 to about 30 carbon atoms; aryl groups having from about 5 to about 30 carbon atoms, for example, from about 5 to about 20 carbon atoms; arylalkyl groups having from about 6 to about 50 carbon atoms, for example, from about 6 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups having from 1 to about 50 carbon atoms, for example, from 1 to about 30 carbon atoms; aryloxy groups having from about 5 to about 30 carbon atoms, for example, from about 5 to about 20 carbon atoms; alkylthio groups having from 1 to about 50 carbon atoms, for example, from 1 to about 30 carbon atoms; arylthio groups having from about 5 to about 30 carbon atoms, for example, from about 5 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups having from 1 to about 20 carbon atoms, for example, from 1 to about 10 carbon atoms; aryloxy groups having from about 5 to about 20 carbon atoms, for example, from about 5 to about 10 carbon atoms; alkylthio groups having from 1 to about 20 carbon atoms, for example, from 1 to about 10 carbon atoms; arylthio groups having from about 5 to about 20 carbon atoms, for example, from about 5 to about 10 carbon atoms; aldehyde groups; ketone groups; ester groups; amide groups; carboxylic acid groups; sulfonic acid groups; and the like. Further, two or more R groups can be joined together to form a ring.

Examples of photochromic azo compounds include azobenzene, 2-methoxyazobenzene, 2-hydroxyazobenzene, 3-methylazobenzene, 3-nitroazobenzene, 3-methoxyazobenzene, 3-hydroxyazobenzene, 4-iodoazobenzene, 4-bromoazobenzene, 4-chloroazobenzene, 4-fluoroazobenzene, 4-methylazobenzene, 4-carbomethoxyazobenzene, 4-acetylazobenzene, 4-carboxyazobenzene, 4-cyanoazobenzene, 4-ethoxyazobenzene, 4-methoxyazobenzene, 4-nitroazobenzene, 4-acetamidoazobenzene, 4-dimethylaminoazobenzene, 4-aminoazobenzene, 4-trimethylammonium azobenzene (with any suitable anion accompanying the ammonium cation, including, for example, $Cl^-$, $Br^-$, $I^-$, $HSO_4^-$, $SO_4^{2-}$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, $CH_3SO_3^-$, $CH_3C_6H_4SO_3^-$, $SO_3^{2-}$, $BrO_3^-$, $IO_3^-$, $ClO_3^-$, or the like, as well as mixtures thereof), 4-dimethylamino-4'-phenylazobenzene, 4-di methylamino-4'-hydroxyazobenzene, 4,4'-bis-(dimethylamino)azobenzene, 4-dimethylamino-4'-p-aminophenylazobenzene, 4-di methylamino-4'-p-acetamidophenylazobenzene, 4-di methylamino-4'-p-aminobenzylazobenzene, 4-dimethylamino-4'-[13-(p-aminophenyl)ethyl] azobenzene, 4-dimethylamino-4'-mercuric acetate azobenzene, 4-hydroxyazobenzene, 2-methyl-4-hydroxyazobenzene, 4-hydroxy-4'-methylazobenzene, 2,6-dimethyl-4-hydroxyazobenzene, 2,2'-4',6,6'-pentamethyl-4-hydroxyazobenzene, 2,6-dimethyl-2',4',6'-trichloro-4-hydroxyazobenzene, 4-hydroxy-4'-chloroazobenzene, 2,2',4',6'-tetrachloro-4-hydroxyazobenzene, 3-sulfonate-4-hydroxyazobenzene, 2,2'-di methoxyazobenzene, 3,3'-dinitroazobenzene, 3,3'-dimethylazobenzene, 4,4'-dimethylazobenzene, 4,4'-dimethoxyazobenzene, 4,4'-dinitroazobenzene, 4,4'-dichloroazobenzene, 2,4-dimethoxyazobenzene, 2,6-dimethoxyazobenzene, 4-nitro-4'-methoxyazobenzene, 2,4,6-trimethylazobenzene, 2,3'-di methoxy-4'-isobutyramidoazobenzene, 2,2',4,4',6,6'-hexamethylazobenzene, 2-hydroxy-5-methylazobenzene, 3,3'-disulfonateazobenzene, 4-methoxy-3'-sulfonateazobenzene, 4-methoxy-4'-sulfonateazobenzene, 2,4-dimethoxy-4'-sulfonateazobenzene, 2,2',4-trimethoxy-5'-sulfonateazobenzene, 4,4'-dimethoxy-3,3'-dicarboxylateazobenzene, 2,2'-azopyridine, 3,3'-azopyridine, 4,4'-azopyridine, 2-phenylazopyridine, 3-phenylazopyridine, 4-phenylazopyridine, 6,6'-azoquinoline, 1-phenylazonaphtalene, 1,1-azonaphthalene, a,2'-azonaphthalene, 2,2'-azonaphthalene, 1-phenylazo-4-naphthol, 1-phenylazo-4-methoxynaphthalene, 3-phenylazo-2-naphthol, 3-phenylazo-2-methoxynaphthalene, 1-(o-hydroxyphenylazo)-2-naphthol, 4-phenylazo-1-naphthylamine, 1-phenylazo-2-naphthylamine, and the like. Polymeric azo materials are also suitable.

Bisimidazoles may be of the general formula:

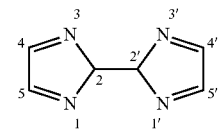

wherein substituents can be present on the 2, 4, 5, 2', 4', and 5' positions. Examples of substituents include hydrogen; alkyl groups, including cyclic alkyl groups, such as cyclopropyl, cyclohexyl, and the like; and including unsaturated alkyl groups, such as vinyl ($H_2C=CH-$), allyl ($H_2C=CH-CH_2-$), propynyl ($HC\equiv C-CH_2-$), and the like, and alkyl groups having from 1 to about 50 carbon atoms, such as from 1 to about 30 carbon atoms; aryl groups having from about 5 to about 30 carbon atoms, for example, from about 5 to about 20 carbon atoms; arylalkyl groups having from about 6 to about 50 carbon atoms, for example, from about 6 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups having from 1 to about 50 carbon atoms, for example, from 1 to about 30 carbon atoms; aryloxy groups having from about 5 to about 30 carbon atoms, for example, from about 5 to about 20 carbon atoms; alkylthio groups having from 1 to about 50 carbon atoms, for example, from 1 to about 30 carbon atoms; arylthio groups having from about 5 to about 30 carbon atoms, for example, from about 5 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups having from 1 to about 20 carbon atoms, for example, from 1 to about 10 carbon atoms; aryloxy groups having from about 5 to about 20 carbon atoms, for example, from about 5 to about 10 carbon atoms; alkylthio groups having from 1 to about 20 carbon atoms, for example, from 1 to about 10 carbon atoms; arylthio groups having from about 5 to about 20 carbon atoms, for example, from about 5 to about 10 carbon atoms; aldehyde groups; ketone groups; ester groups; amide groups; carboxylic acid groups; sulfonic acid groups; and the like. Further, two or more R groups can be joined together to form a ring.

Also suitable as the photochromic compound is benzo and naphthopyrans (chromenes) of general formulas (the closed form may be colorless/weakly colored; the open form may be differently colored):

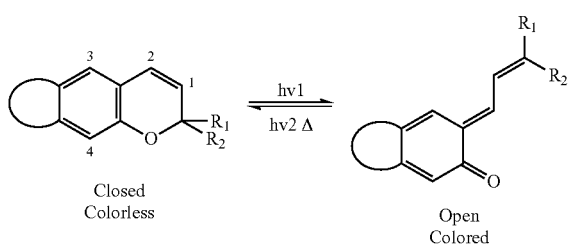

Closed
Colorless

Open
Colored wherein one, two, three or more substituents may be optionally present at the 1, 2, 3 and 4 positions, wherein the substituents and $R_1$ and $R_2$ are each, independently of the other, aromatic groups. The aromatic groups can be substituted, with examples of substituents including alkyl groups, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, alkyl groups for example having from 1 to about 50 carbon atoms, such as from 1 to about 30 carbon atoms; aryl groups having, for example, from about 6 to about 30 carbon atoms and such as from about 6 to about 20 carbon atoms; arylalkyl groups having, for example, from about 7 to about 50 carbon atoms and such as from about 7 to about 30 carbon atoms; silyl groups; nitro groups, cyano groups; halide atoms, such as fluoride, chloride, bromide, iodide, and astatide; amine groups, including primary, secondary, and tertiary amines; hydroxy groups; alkoxy groups having, for example, from 1 to about 50 carbon atoms and such as from 1 to about 30 carbon atoms; aryloxy groups having, for example, from about 6 to about 30 carbon atoms and from about 6 to about 20 carbon atoms; alkylthio groups having, for example, from 1 to about 50 carbon atoms and from 1 to about 30 carbon atoms; arylthio groups having, for example, from about 6 to about 30 carbon atoms and from about 6 to about 20 carbon atoms; aldehyde groups; ketone groups; ester groups; amide groups, carboxylic acid groups; sulfonic acid groups; and the like. Alkyl, aryl, and arylalkyl substituents can also be further substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups having, for example, from 1 to about 30 carbon atoms and from 1 to about 20 carbon atoms; aryloxy groups having, for example, from about 6 to about 30 carbon atoms and from about 6 to about 20 carbon atoms; alkylthio groups having, for example, from 1 to about 30 carbon atoms and from 1 to about 20 carbon atoms; arylthio groups having, for example, from about 6 to about 30 carbon atoms and from about 6 to about 20 carbon atoms; aldehyde groups; ketone groups; ester groups; amide groups; carboxylic acid groups; sulfonic acid groups; and the like. Further, two or more substituents can be joined together to form a ring. Specific examples of chromenes include 3,3-diphenyl-3H-naphtho[2,1-b]pyran; 2-methyl-7,7-diphenyl-7H-pyrano-[2,3-g]-benzothyazole; 2,2'-spiroadamantylidene-2H-naphtho-[1,2-b]pyran; and the like.

Synthesis of chromenes is described for example in the following references: P. Bamfield, Chromic Phenomena, Technological applications of color chemistry, RSC, Cambridge, 2001 and J. C. Crano and R. J. Guglielmetti, Organic Photochromic and Thermochromic Compounds, Vol. 1, Main Photochromic Families (Topics in Applied Chemistry), Plenum Press, New York, 1999, the disclosures of which are totally incorporated herein by reference.

Spirodihydroindolizines and related systems (tetrahydro- and hexahydroindolizine are also suitable photochromic compounds. The general formulas of spirodihydroindolizines are shown below (the closed form may be colorless/weakly colored; the open form may be differently colored):

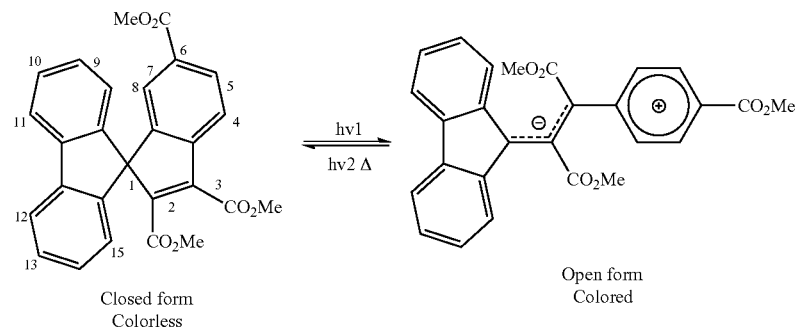

Closed form
Colorless

Open form
Colored wherein one, two, three or more substituents may be optionally present at the 4, 5, 6, 7, 8, 9, 10, 11, 12 and 13 positions. Examples of substituents include (but are not limited to) alkyl groups, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$); and the like, for example, alkyl groups having from 1 to about 50 carbon atoms and from 1 to about 30 carbon atoms; aryl groups having, for example, from about 6 to about 30 carbon atoms and from about 6 to about 20 carbon atoms; arylalkyl groups having, for example, from about 7 to about 50 carbon atoms and from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups having, for example, from 1 to about 50 carbon atoms and from 1 to about 30 carbon atoms; aryloxy groups having, for example, from about 6 to about 30 carbon atoms and from about 6 to about 20 carbon atoms; alkylthio groups having, for example, from 1 to about 50 carbon atoms and from 1 to about 30 carbon atoms; arylthio groups having, for example, from about 6 to about 30 carbon atoms and from about 6 to about 20 carbon atoms; aldehyde groups; ketone groups; ester groups; amide groups; carboxylic acid groups; sulfonic acid groups; and the like. The alkyl, aryl, and arylalkyl groups can also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups having, for example, from 1 to about 30 carbon atoms and from 1 to about 20 carbon atoms; aryloxy groups having, for example, from about 6 to about 30 carbon atoms and from about 6 to about 20 carbon atoms; alkylthio groups having, for example, from 1 to about 30 carbon atoms and from 1 to about 20 carbon atoms; arylthio groups having, for example, from about 6 to about 30 carbon atoms and from about 6 to about 20 carbon atoms; aldehyde groups; ketone groups; ester groups; amide groups; carboxylic acid groups; sulfonic acid groups; and the like. Further, two or more substituents can be joined together to form a ring.

Specific examples of photochromic spirodihydroindolizines include for example 4,5-dicarbomethoxy-3H-pyrazole-(3-spiro-9)-fluorene; 1'H-2',3'-6 tricarbomethoxy-spiro(fluorine-9-1'-pyrrolo[1,2-b]-pyridazine]; 1'H-2',3'-dicyano-7-methoxy-carbonyl-spiro[fluorine-9,1'-pyrrolo-[1,2-b] pyridine.

Spirodihydroindolizines synthesis is described for example in J. C. Crano and R. J. Guglielmetti, Organic Photochromic and Thermochromic Compounds, Vol. 1, Main Photochromic Families (Topics in Applied Chemistry), Plenum Press, New York, 1999, the disclosure of which is totally incorporated herein by reference. Photochromic quinones of formulas (the form on the left may be colorless/weakly colored; the form on the right may be colored):

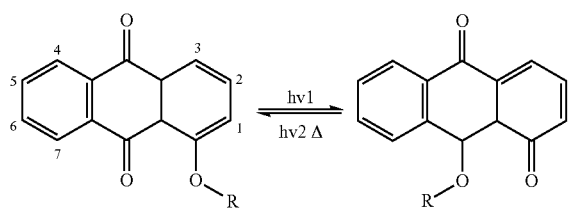

wherein one, two, three or more substituents may be optionally present at the 2, 4, 5, 6 and 7 positions. Examples of substituents and the R moiety include alkyl groups, including cyclic alkyl groups, such as cyclopropyl, cyclohexyl, and the like; and including unsaturated alkyl groups, such as vinyl ($H_2C=CH$), allyl ($H_2C=CH-CH_2-$), propynyl ($HC\equiv C-CH_2-$); and the like, alkyl groups having, for example, from 1 to about 50 carbon atoms and s from 1 to about 30 carbon atoms; aryl groups having, for example, from about 6 to about 30 carbon atoms and from about 6 to about 20 carbon atoms; arylalkyl groups having, for example, from about 7 to about 50 carbon atoms and from about 7 to about 30 carbon atoms; silyl groups, nitro groups; cyano groups; halide atoms, such as fluoride, chloride, bromide; iodide, and astatide; amine groups, including primary, secondary, and tertiary amines; hydroxy groups; alkoxy groups having, for example, from 1 to about 50 carbon atoms and from about 1 to about 30 carbon atoms; aryloxy groups having, for example, from about 6 to about 30 carbon atoms and from about 6 to about 20 carbon atoms; alkylthio groups having, for example, from 1 to about 50 carbon atoms and from 1 to about 30 carbon atoms; arylthio groups having, for example with from about 6 to about 30 carbon atoms and from about 6 to about 20 carbon atoms; aldehyde groups; ketone groups; ester groups; amide groups; carboxylic acid groups; sulfonic acid groups; and the like. The alkyl, aryl, and arylalkyl groups can also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups having, for example from 1 to about 30 carbon atoms and from 1 to about 20 carbon atoms; aryloxy groups having; for example, from about 6 to about 30 carbon atoms and from about 6 to about 20 carbon atoms; alkylthio groups having, for example with from 1 to about 30 carbon atoms and from 1 to about 20 carbon atoms; arylthio groups having, for example, from about 6 to about 30 carbon atoms and from about 6 to about 20 carbon atoms; aldehyde groups; ketone groups; ester groups; amide groups; carboxylic acid groups; sulfonic acid groups; and the like. Further, two or more substituents can be joined together to form a ring. In embodiments, the R moiety is hydrogen.

Specific examples of photochromic quinones include for example 1-phenoxy-2,4-dioxyanthraquinone; 6-phenoxy-5,12-naphthacenequinone; 6-phenoxy-5,12-pentacenequinone; 1,3-dichloro-6-phenoxy-7,12-phthaloylpyrene; and the like.

Photochromic quinones synthesis is described for example in J. C. Crano and R. J. Guglielmetti, Organic Photochromic and Thermochromic Compounds, Vol. 1, Main Photochromic Families (Topics in Applied Chemistry), Plenum Press, New York, 1999, the disclosure of which is totally incorporated herein by reference.

Perimidinespirocyclohexadienones of the following formulas are suitable as the photochromic compound (the form on the left may be colorless/weakly colored; the form on the right may be differently colored):

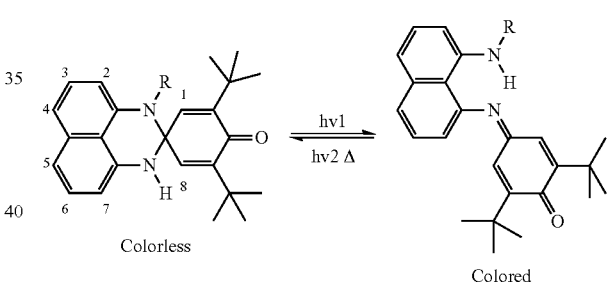

Colorless      Colored wherein one, two, three or more substituents may be optionally present at the 1, 2, 4, 5, 6, 7 and 8 positions. Examples of substituents and the R moiety include alkyl groups, including cyclic alkyl groups, such as cyclopropyl, cyclohexyl, and the like, and including unsaturated alkyl groups, such as vinyl ($H_2C=CH$); allyl ($H_2C=CH-CH_2-$); propynyl ($HC\equiv C-CH_2-$); and the like, alkyl groups having from 1 to about 50 carbon atoms and from 1 to about 30 carbon atoms; aryl groups having, for example with from about 6 to about 30 carbon atoms and from about 6 to about 20 carbon atoms; arylalkyl groups having, for example, from about 7 to about 50 carbon atoms and from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups having, for example, from 1 to about 50 carbon atoms and from 1 to about 30 carbon atoms; aryloxy groups having, for example, from about 6 to about 30 carbon atoms and from about 6 to about 20 carbon atoms; alkylthio groups having, for example, from 1 to about 50 carbon atoms and from 1 to about 30 carbon atoms; arylthio groups having, for example, from about 6 to about 30 carbon atoms and from about 6 to about 20 carbon atoms; aldehyde groups; ketone groups; ester groups; amide groups; carboxylic acid groups; sulfonic acid groups; and the like. The alkyl, aryl, and arylalkyl groups can also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups having, for example, from 1 to about 30 carbon atoms and from 1 to about 20 carbon atoms; aryloxy groups having, for example, from about 6 to about 30 carbon atoms and from about 6 to about 20 carbon atoms; alkylthio groups having, for example, from 1 to about 30 carbon atoms and from 1 to about 20 carbon atoms; arylthio groups having, for example, from about 6 to about 30 carbon atoms and from about 6 to about 20 carbon atoms; aldehyde groups; ketone groups; ester groups; amide groups; carboxylic acid groups; sulfonic acid groups; and the like. Further, two or more substituents can be joined together to form a ring. In embodiments, the R moiety is hydrogen.

Specific examples of photochromic perimidinespirocyclohexadienones include for example 2,3-dihydro-2-spiro-4'-(2',6'-di-tert-butylcyclohexadien-2',5'-one)-perimidine; 1-methyl-2,3-dihydro-2-spiro-4'-(2',6'-di-tert-butylcyclohexadien-2',5'-one)-perimidine; 2,3-dihydro-2-spiro-4'-[(4H)-2'-tert-butylnaphthalen-1'-one]perimidine; 5,7,9-trimethyl-2,3-dihydro-2-spiro-4'-(2',6'-di-tert-butylcyclohexadien-2',5'-one)-pyrido-[4,3,2,d,e]quinazoline; and the like.

Photochromic perimidinespirocyclohexadienones synthesis is described for example in J. C. Crano and R. J. Guglielmetti, Organic Photochromic and Thermochromic Compounds, Vol. 1, Main Photochromic Families (Topics in Applied Chemistry), Plenum Press, New York, 1999, the disclosure of which is totally incorporated herein by reference.

Photochromic viologens of the following formulas (the form on the left may be colorless/weakly colored; the form on the right may be differently colored):

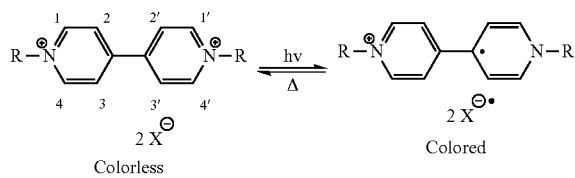

Colorless     Colored wherein one, two, three or more substituents may be optionally present at the 1, 2, 3, 4, 5, 6, 7 and 8 positions. Examples of substituents and R moiety include alkyl groups, including cyclic alkyl groups, such as cyclopropyl, cyclohexyl, and the like; and including unsaturated alkyl groups, such as vinyl (H$_2$C=CH—); allyl (H$_2$C=CH—CH$_2$—); propynyl (HC≡C—CH$_2$—); and the like, alkyl groups having, for example, from 1 to about 50 carbon atoms and from 1 to about 30 carbon atoms; aryl groups having, for example, from about 6 to about 30 carbon atoms and from about 6 to about 20 carbon atoms; arylalkyl groups having, for example, from about 7 to about 50 carbon atoms and from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups having, for example, from 1 to about 50 carbon atoms and from 1 to about 30 carbon atoms; aryloxy groups having, for example, from about 6 to about 30 carbon atoms and from about 6 to about 20 carbon atoms; alkylthio groups having, for example, from 1 to about 50 carbon atoms and such as from 1 to about 30 carbon atoms; arylthio groups having, for example, from about 6 to about 30 carbon atoms and from about 6 to about 20 carbon atoms; aldehyde groups; ketone groups; ester groups; amide groups; carboxylic acid groups; sulfonic acid groups; and the like. The alkyl, aryl, and arylalkyl groups can also be substituted with groups such as, for example, silyl groups; nitro groups; cyano groups; halide atoms, such as fluoride, chloride, bromide, iodide, and astatide amine groups, including primary, secondary, and tertiary amines, hydroxy groups, alkoxy groups having, for example, from 1 to about 30 carbon atoms and from 1 to about 20 carbon atoms; aryloxy groups having, for example, from about 6 to about 30 carbon atoms and from about 6 to about 20 carbon atoms; alkylthio groups having, for example, from 1 to about 30 carbon atoms and from 1 to about 20 carbon atoms; arylthio groups having, for example, from about 6 to about 30 carbon atoms and from about 6 to about 20 carbon atoms; aldehyde groups ketone groups; ester groups; amide groups; carboxylic acid groups; sulfonic acid groups; and the like. Further, two or more substituents can be joined together to form a ring. In embodiments, the R moiety is hydrogen.

The X moiety can be any anion that acts as a counterion and is needed to compensate the positive charge of the bipyridinium cation. The X moiety can be, for example, a halogen anion like fluoride, chloride, bromide and iodide ions, tosylate, triflate; and other anions.

Specific examples of photochromic viologens include, for example, N,N'-dimethyl-4,4'-bipyridinium dichloride; N,N'-diethyl-4,4'-bipyridinium dibromide; N-phenyl, N'-methyl-4,4,-bipyridinium dichloride and the like.

Synthesis of photochromic viologens is described for example in J. C. Crano and R. J. Guglielmetti, Organic Photochromic and Thermochromic Compounds, Vol. 1, Main Photochromic Families (Topics in Applied Chemistry), Plenum Press, New York, 1999, the disclosure of which is totally incorporated herein by reference.

Fulgides and fulgimides of the following formulas are suitable as the photochromic compound (the open form may be colorless/weakly colored; the closed form may be differently colored):

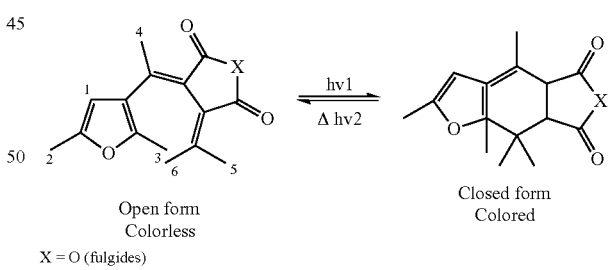

Open form     Closed form
Colorless     Colored

X = O (fulgides)
X = NR (fulgimides)

wherein one, two, three or more substituents may be optionally present at the 1, 2, 4, 5 and 6 positions. Examples of substituents and the R moiety include alkyl groups, including cyclic alkyl groups, such as cyclopropyl, cyclohexyl, and the like, and including unsaturated alkyl groups, such as vinyl (H$_2$C=CH—), allyl (H$_2$C=CH—CH$_2$—), propynyl (HC≡C—CH$_2$—); and the like, for example, alkyl groups having from 1 to about 50 carbon atoms and from 1 to about 30 carbon atoms, aryl groups having, for example, from about 6 to about 30 carbon atoms and from about 6 to about 20 carbon atoms; arylalkyl groups having, for example, from about 7 to about 50 carbon atoms and from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups having, for example, from 1 to about 50 carbon atoms and from 1 to about 30 carbon atoms; aryloxy groups having, for example, from about 6 to about 30 carbon atoms and from about 6 to about 20 carbon atoms; alkylthio groups having, for example, from 1 to about 50 carbon atoms and from 1 to about 30 carbon atoms; arylthio groups having, for example, from about 6 to about 30 carbon atoms and from about 6 to about 20 carbon atoms; aldehyde groups; ketone groups; ester groups; amide groups; carboxylic acid groups; sulfonic acid groups; and the like. The alkyl, aryl, and arylalkyl groups can also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups having, for example, from 1 to about 30 carbon atoms and from 1 to about 20 carbon atoms; aryloxy groups having, for example, from about 6 to about 30 carbon atoms and from about 6 to about 20 carbon atoms; alkylthio groups having, for example, from 1 to about 30 carbon atoms and from 1 to about 20 carbon atoms; arylthio groups having, for example, from about 6 to about 30 carbon atoms and from about 6 to about 20 carbon atoms; aldehyde groups; ketone groups; ester groups; amide groups; carboxylic acid groups; sulfonic acid groups; and the like. Further, two or more substituents can be joined together to form a ring. In embodiments, the R moiety is hydrogen.

Specific examples of fulgides include 1-(p-methoxyphenyl)-ethylidene (isopropylidene) succinic anhydride; 2-[1-(2,5-dimethyl-3-furyl)-2-methylpropylidene]-3-isopropylidene succinic anhydride; (1,2-dimethyl-4-isopropyl-5-phenyl)-3-pyrryl ethylidene (isopropylidene) succinic anhydride.

Synthesis of photochromic fulgides is described for example, in J. C. Crano and R. J. Guglielmetti, Organic Photochromic and Thermochromic Compounds, Vol. 1, Main Photochromic Families (Topics in Applied Chemistry), Plenum Press, New York, 1999, the disclosure of which is totally incorporated herein by reference.

Diarylethenes and related compounds of the following formulas are suitable as the photochromic compound (the open form may be colorless/weakly colored; the closed form may be differently colored):

cyclohexyl, and the like, and including unsaturated alkyl groups, such as vinyl ($H_2C=CH-$), allyl ($H_2C=CH-CH_2-$), propynyl ($HC\equiv C-CH_2-$), and the like, alkyl groups having, for example, from 1 to about 50 carbon atoms and from 1 to about 30 carbon atoms; aryl groups having, for example, from about 6 to about 30 carbon atoms and from about 6 to about 20 carbon atoms; arylalkyl groups having, for example from about 7 to about 50 carbon atoms and from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups having, for example, from 1 to about 50 carbon atoms and from 1 to about 30 carbon atoms; aryloxy groups having, for example, from about 6 to about 30 carbon atoms and from about 6 to about 20 carbon atoms; alkylthio groups having, for example, from 1 to about 50 carbon atoms and from 1 to about 30 carbon atoms; arylthio groups having, for example, from about 6 to about 30 carbon atoms and S from about 6 to about 20 carbon atoms; aldehyde groups; ketone groups; ester groups; amide groups; carboxylic acid groups; sulfonic acid groups; and the like. The alkyl, aryl, and arylalkyl groups can also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups having, for example, from 1 to about 30 carbon atoms and from 1 to about 20 carbon atoms; aryloxy groups having, for example, from about 6 to about 30 carbon atoms and from about 6 to about 20 carbon atoms; alkylthio groups having, for example, from 1 to about 30 carbon atoms and from 1 to about 20 carbon atoms; arylthio groups having, for example, from about 6 to about 30 carbon atoms and from about 6 to about 20 carbon atoms; aldehyde groups; ketone groups; ester groups; amide groups; carboxylic acid groups; sulfonic acid groups; and the like. Further, two or more substituents can be joined together to form a ring.

Specific examples of diarylethylenes include 1,2-bis-(2,4-dimethylthiophen-3-yl) perfluorocyclopentene; 1,2-bis-(3,5-dimethylthiophen-3-yl) perfluorocyclopentene; 1,2-bis-(2,4-diphenyllthiophen-3-yl) perfluorocyclopentene; and the like.

Synthesis of photochromic diarylethenes is known and is described, for example, in J. C. Crano and R. J. Guglielmetti, Organic Photochromic and Thermochromic Compounds, Vol. 1, Main Photochromic Families (Topics in Applied Chemistry), Plenum Press, New York, 1999, the disclosure of which is totally incorporated herein by reference.

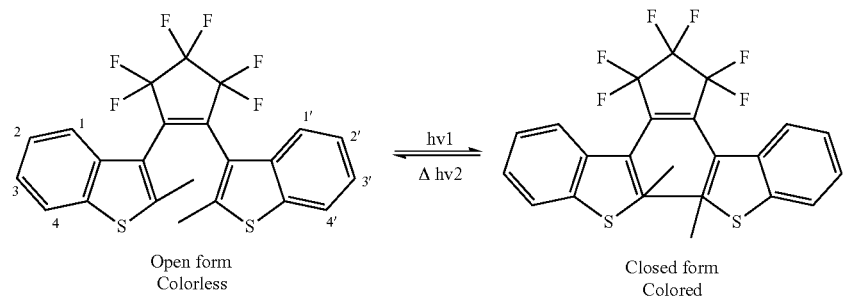

Open form
Colorless

Closed form
Colored wherein one, two, three or more substituents may be optionally present at the 1, 2, 3, 4, 1', 2', 3' and 4' positions. Examples of substituents include (but are not limited to) alkyl groups, including cyclic alkyl groups, such as cyclopropyl, Triarylmethanes of the following formulas are suitable as the photochromic compound (the form on the left may be colorless/weakly colored; the form on the right may be differently colored):

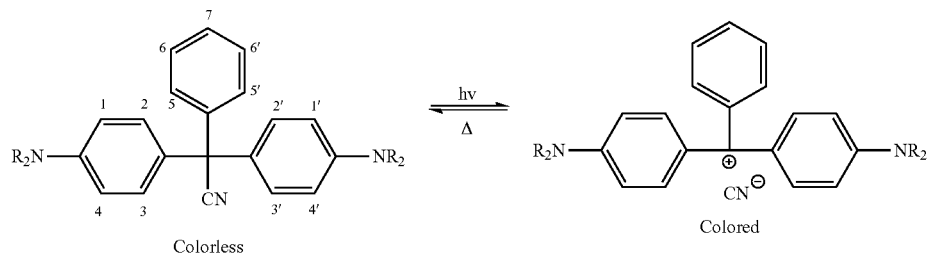

wherein one, two, three or more substituents may be optionally present at the 1, 2, 3, 4, 5, 6, 7, 1', 2', 3', 4', 5' and 6' positions. Examples of substituents and the R moiety include (but are not limited to) alkyl groups, including cyclic alkyl groups, such as cyclopropyl, cyclohexyl, and the like, and including unsaturated alkyl groups, such as vinyl ($H_2C$=CH—), allyl ($H_2C$=CH—$CH_2$—), propynyl (HC≡C—$CH_2$—), and the like, alkyl groups having, for example, with from 1 to about 50 carbon atoms and such as from 1 to about 30 carbon atoms; aryl groups having, for example, with from about 6 to about 30 carbon atoms and from about 6 to about 20 carbon atoms; arylalkyl groups having, for example, from about 7 to about 50 carbon atoms and from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups having, for example, from 1 to about 50 carbon atoms and from 1 to about 30 carbon atoms; aryloxy groups having, for example, from about 6 to about 30 carbon atoms and from about 6 to about 20 carbon atoms; alkylthio groups having, for example, from 1 to about 50 carbon atoms and from 1 to about 30 carbon atoms; arylthio groups having, for example, from about 6 to about 30 carbon atoms and from about 6 to about 20 carbon atoms; aldehyde groups; ketone groups; ester groups; amide groups; carboxylic acid groups; sulfonic acid groups; and the like. The alkyl, aryl, and arylalkyl groups can also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups having for example, from 1 to about 30 carbon atoms and from 1 to about 20 carbon atoms; aryloxy groups having, for example, from about 6 to about 30 carbon atoms and from about 6 to about 20 carbon atoms; alkylthio groups having, for example, from 1 to about 30 carbon atoms and from 1 to about 20 carbon atoms; arylthio groups having, for example, from about 6 to about 30 carbon atoms and from about 6 to about 20 carbon atoms, aldehyde groups; ketone groups; ester groups; amide groups; carboxylic acid groups; sulfonic acid groups; and the like. Further, two or more substituents can be joined together to form a ring. In embodiments, the R moiety is hydrogen.

Specific examples of triarylmethanes include compounds:

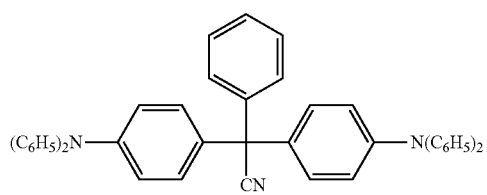

-continued

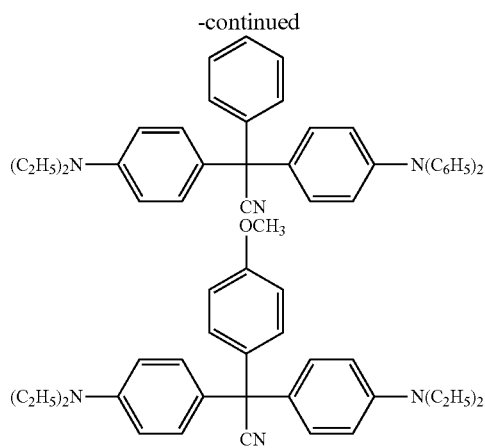

Synthesis of triarylmethanes is described, for example, in H. Taro, M. Kodo, Bull. Chem. Soc. Jpn., 38(12) p. 2202 (1965), the disclosure of which is totally incorporated herein by reference.

Anils and related compounds of the following formulas are suitable as the photochromic compound (the form on the left may be colorless/weakly colored; the form on the right may be differently colored):

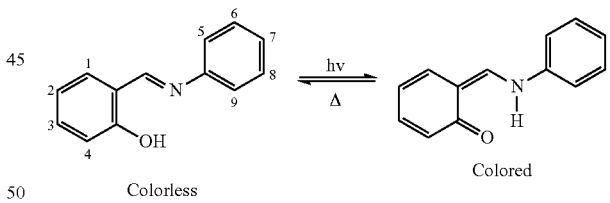

wherein one, two, three or more substituents may be optionally present at the 1, 2, 3, 4, 5, 6, 7, 8 and 9. Examples of substituents include (but are not limited to) alkyl groups, including cyclic alkyl groups, such as cyclopropyl, cyclohexyl, and the like, and including unsaturated alkyl groups, such as vinyl ($H_2C$=CH—), allyl ($H_2C$=CH—$CH_2$—), propynyl (HC≡C—$CH_2$—), and the like, alkyl groups having, for example, from 1 to about 50 carbon atoms and from 1 to about 30 carbon atoms; aryl groups having, for example, from about 6 to about 30 carbon atoms and from about 6 to about 20 carbon atoms; arylalkyl groups having, for example, from about 7 to about 50 carbon atoms and from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups having, for example, from 1 to about 50 carbon atoms and from 1 to about 30 carbon atoms; aryloxy groups having, for example, from about 6 to about 30 carbon atoms and from about 6 to about 20 carbon atoms; alkylthio groups having, for example, from 1 to about 50 carbon atoms and from 1 to about 30 carbon atoms; arylthio groups having, for example, from about 6 to about 30 carbon atoms and from about 6 to about 20 carbon atoms; aldehyde groups; ketone groups; ester groups; amide groups; carboxylic acid groups; sulfonic acid groups, and the like. The alkyl, aryl, and arylalkyl groups can also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups having, for example, from 1 to about 30 carbon atoms and from 1 to about 20 carbon atoms; aryloxy groups having, for example, from about 6 to about 30 carbon atoms and from about 6 to about 20 carbon atoms; alkylthio groups having, for example, from 1 to about 30 carbon atoms and from 1 to about 20 carbon atoms; arylthio groups having, for example, from about 6 to about 30 carbon atoms and from about 6 to about 20 carbon atoms; aldehyde groups; ketone groups; ester groups; amide groups; carboxylic acid groups; sulfonic acid groups; and the like. Further, two or more substituents can be joined together to form a ring.

Specific examples of anils and related compounds include molecules:

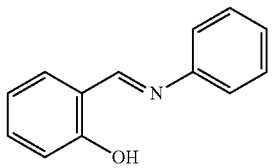

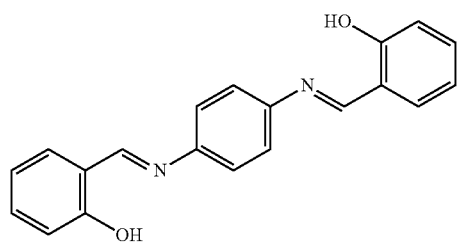

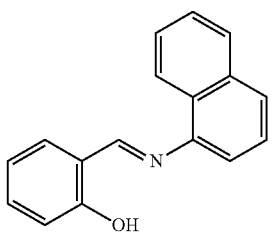

Photochromic anils are known and their synthesis has been described, for example, in K. Kownacki, L. Kaczmarek, A. Grabowska, Chem. Phys. Lett., 210, p. 373 (1993); M. S. M. Rawat, S. Mal, G. Pant, Current Science, 58, p. 796 (1989); P. F. Barbara, P. M., Rentzepis, L. E. Brus, J. Am. Chem. Soc., 102, p. 2786 (1980), the disclosures of which are totally incorporated herein by reference.

Hydrazines may be of the general formula:

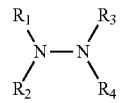

wherein $R^1$, $R^2$, $R^3$, and $R^4$ each, independently of the others, may be hydrogen, alkyl groups, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, and alkyl groups having from 1 to about 50 carbon atoms, such as from 1 to about 30 carbon atoms; aryl groups having, for example, from about 5 to about 30 carbon atoms, and from about 5 to about 20 carbon atoms; arylalkyl groups having, for example, from about 6 to about 50 carbon atoms and from about 6 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups having, for example, from 1 to about 50 carbon atoms and from 1 to about 30 carbon atoms; aryloxy groups having, for example, from about 5 to about 30 carbon atoms and from about 5 to about 20 carbon atoms; alkylthio groups having, for example, from 1 to about 50 carbon atoms and from 1 to about 30 carbon atoms; arylthio groups having, for example, from about 5 to about 30 carbon atoms and from about 5 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups having, for example, from 1 to about 20 carbon atoms and from 1 to about 10 carbon atoms; aryloxy groups having, for example, from about 5 to about 20 carbon atoms and from about 5 to about 10 carbon atoms; alkylthio groups having, for example, from 1 to about 20 carbon atoms and from 1 to about 10 carbon atoms; arylthio groups having, for example, from about 5 to about 20 carbon atoms and from about 5 to about 10 carbon atoms; aldehyde groups; ketone groups; ester groups; amide groups; carboxylic acid groups; sulfonic acid groups; and the like. Further, two or more R groups can be joined together to form a ring.

Aryl disulfides may be of the general formula:

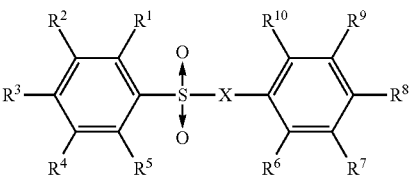

An organic mixture of 4 g of the photochromic polymer that is spiro[2H-1-benzopyran-2,2'-[2H]indole]-8-methanol, 1',1'''-[1,4-phenylenebis(methylene)]bis[1',3'-dihydro-3',3'-dimethyl-6-nitro-, polymer with hexanedioic acid and 4,4'-(1-methylethylidene)bis[phenol] (Compound # 1), 10 g of a custom polyester resin that is poly[oxy(1,6-dioxo-1,6-hexanediyl)oxy-1,4-phenylene(1-methylethylidene)-1,4-phenylene] polymer (Compound # 2) as a binder, and 130 g of ethyl acetate as a solvent was prepared under a heated oil bath at 70° C. and magnetic stirring.

The concentration of the humectant present in the printing ink herein can be from about 0.1 to about 50.0 weight percent,

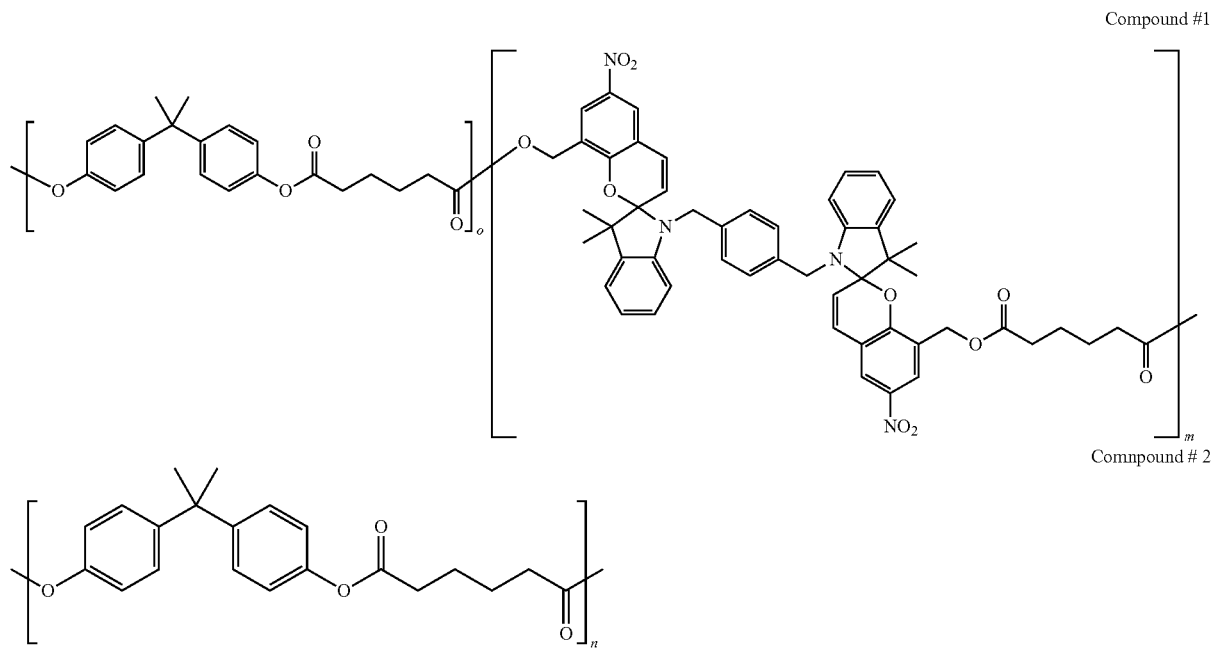

or from about 0.5 to about 40.0 weight percent, or from about 1.0 to about 30.0 weight percent of the printing ink.

Surfactants:

Surfactants can be used to adjust the surface tension of the ink to desired ranges for print process. The surfactant may be selected from cationic, anionic and nonionic surfactants. Suitable surfactants include, for example, polyoxyethylene alkyl ether, polyoxyethylene sorbitol monostearate, polyoxyethylene oleyl ether, and polyoxyethylene stearyl ether. Specific examples include, for example, Triton® available from Rohm and Haas; Tamol® SN and LG available by The Dow Chemical Company, Igepal® available from GAF Company, Pluronic® F-68 available from BASF, and mixtures thereof.

The concentration of the surfactant present in the printing ink herein can be from about 0.01 to about 10.0 weight percent, or from about 0.05 to about 10.0 weight percent, or from about 0.1 to about 5.0 weight percent of the printing ink.

Viscosity Control Additive:

Viscosity control additives can be used to adjust the viscosity of the ink to desired ranges. Suitable viscosity control additives include water soluble polymers, such as Gum Arabic, polyacrylate salts, polymethacrylate salts, polyvinyl alcohols, polyethylene oxides, poyethylene glycols, polypropylene glycols, hydroxy propylcellulose, hydroxyethylcellulose, polyvinylpyrrolidinone, polyvinylether, starch, polyacrylamide, lignin sulfonate salts, copolymers of naphthalene sulfonate salts and formaldehyde, polysaccharides, cellulose, glycerol, and mixtures thereof.

The concentration of the viscosity control additive present in the printing ink herein can be from about 0.1 to about 20.0 weight percent, or from about 0.5 to about 10.0 weight percent, or from about 1.0 to about 10.0 weight percent of the printing ink.

Latex Inkjet Ink Physical Properties

Photochromic latex inks can be applied via inkjet either onto an intermediate receiving member (indirect printing) or Colorants A permanent colorant is optional. It can be particularly desired for making prints which change from one permanent color to a different color when exposed to UV light. Colorants can be solvent-based dyes or pigments. When dyes are used, they can be incorporated in the structure of the latex particle; therefore they can be compatible with the organic polymer material. When pigments are used, they can be provided as a dispersion in water, which is mixed with a latex base to provide a multi-particle (latex and pigment) dispersion which, with the additional additives, forms the actual latex ink.

In some embodiments, the permanent color dye can be placed as an outer shell of the latex particles containing the photochromic compounds. This is useful, for example, for controlling the amount of visible light experienced by the prints, and ultimately the color reversing time as well as the initial color of the prints.

The concentration of the colorant present in the particle core or inner shell or both the core and the inner shell can be from about 0.5 to about 20 weight percent, or from about 1 to about 15 weight percent, or from about 2 to about 10 weight percent of the printing ink.

The latex particles may be dispersed on a carrier to form the ink composition. The carrier may include at least one of humectants, surfactants, viscosity-controlling additives, and water.

Humectants:

Humectants are typically liquids with a boiling temperature higher than water which evaporate slowly to prevent premature evaporation of the ink on the print-head nozzles. Suitable humectants for embodiments herein include: ethylene glycol, propylene glycol, diethylene glycol, glycerine, dipropylene glycol, polyethylene glycols, polypropylene glycols, amides, ethers, carboxylic acids and their salts, esters, alcohols, organosulfides, organosulfoxides, sulfones, alcohol derivatives, hydroxyether derivatives such as amino alcohols, and mixtures thereof.

direct to substrate (direct-to-paper). Droplets of ink may be jetted from a small aperture directly to a specified position on a media to create the printing image. The intermediate member should have a higher surface energy than that of the liquid ink surface tension. The ink can then be dried to evaporate the water leaving a solid film on the intermediate receiving member. The film can then be transferred to the final substrate. Typical jetting temperatures of water-based inkjet inks range from about 25° C. to about 70° C., or from about 28° C. to about 60° C., or from about 30° C. to about 50° C. In one specific embodiment, the jetting temperature is about 35° C. For these reasons, embodiments of the present ink have specific characteristics that are beyond the scope of routine experimentation, such as surface tension, viscosity, and particle size.

In embodiments, the present ink can have a viscosity of from about 2 cPs to about 20 cPs, or from about 3 cPs to about 15 cPs, or from about 4 cPs to about 12 cPs at the above jetting temperatures.

In embodiments, the present ink can have a surface tension from about 15 mN/m to about 50 mN/m, or from about 15 mN/m to about 45 mN/m, or from about 20 mN/m to about 40 mN/m, at the above jetting temperatures.

The ink, according to exemplary embodiments having a core/shell configuration, can have an average particle size from about 20 nm to about 600 nm, or from about 80 nm to about 350 nm, or from about 90 nm to about 300 nm. In exemplary embodiments having a core configuration, the ink can have an average particle size from about 20 nm to about 600 nm, or from about 80 nm to about 350 nm, or from about 90 nm to about 300 nm.

In some embodiments, the present ink can have a multimodal (such as bimodal) distribution of particles. In one exemplary embodiment having a core/shell configuration, a first type of particle can have a particle size (as measured from 0.0 to 5000 nm) from about 10 to about 80 nm, or from about 20 to about 80 nm, or from about 20 nm to about 50 nm; and the second type of particle can have a particle size from about 80 nm to about 600 nm, or from about 80 to about 400 nm, or from about 80 nm to about 300 nm. In another exemplary embodiment having a core configuration, a first type of particle can have a particle size (as measured from 0.0 to 5000 nm) from about 10 to about 80 nm, or from about 20 to about 80 nm, or from about 20 nm to about 50 nm; and the second type of particle can have a particle size from about 80 nm to about 600 nm, or from about 80 to about 400 nm, or from about 80 nm to about 300 nm.

EXAMPLE

The following Example illustrates one exemplary embodiment of the present disclosure. This Example is intended to be illustrative only and shows one of several methods of preparing the ink particle and is not intended to limit the scope of the present disclosure. Also, parts and percentages are by weight unless otherwise indicated.

Example 1

Preparation of a Light Responsive (Photochromic) Emulsion by Solvent Flash Process (Latex A)

An organic mixture of 4 g of the photochromic polymer that is poly (1',1'-p-xylene-bis(6-nitro-3',3' dimethyl-spiro [2H-1-benzopyran-2,2' indoline])-co-adipic acid-co-bisphenol A) (Compound # 1), 10 g of a custom polyester resin that is poly[oxy(1,6-dioxo-1,6-hexanediyl)oxy-1,4-phenylene(1-methylethylidene)-1,4-phenylene] polymer (Compound # 2) as a binder, and 130 g of ethyl acetate as a solvent was prepared under a heated oil bath at 70° C. and magnetic stirring.

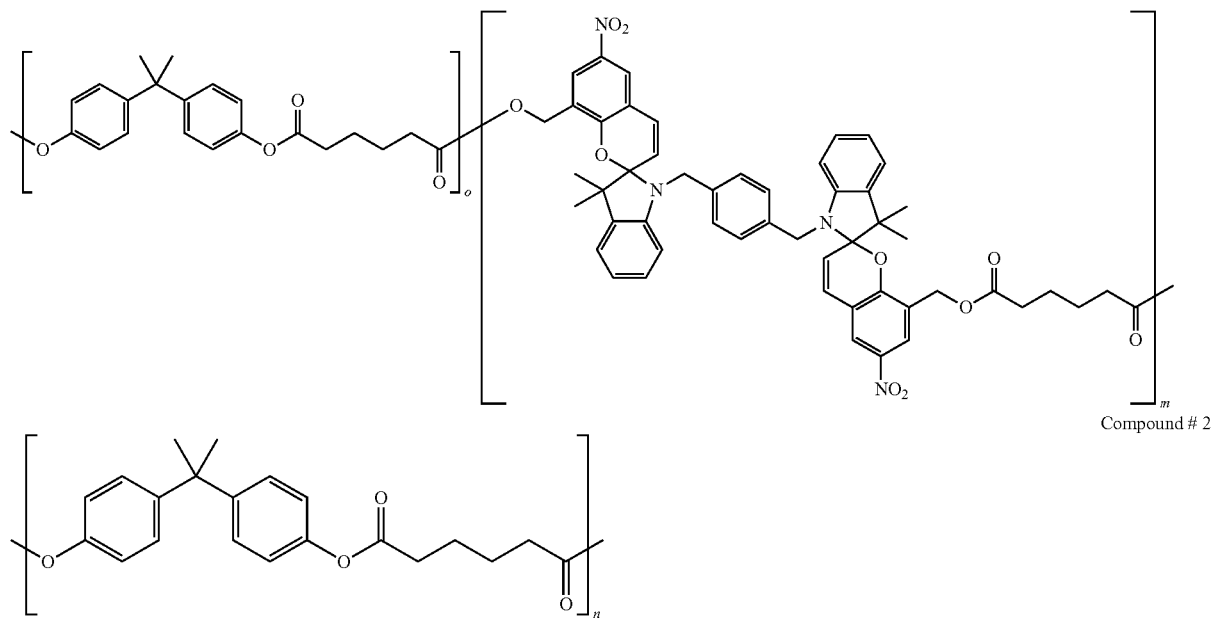

Compound #1

Compound # 2

When heated, the organic mixture was left to cool, and then filtered with 1 micrometer syringe filters. In preparation for making the emulsion, 66 g of the filtered organic mixture was heated in an oil bath at 50° C. in one bottle, while mixing 0.325 g of surfactant (Dowfax 2A1) and 40 g of distilled water in another. Once heated, the surfactant solution was homogenized using a IKA® T-18 ultra Turrax homogenizer by Cole Palmer. Then, 1 g of concentrated ammonium hydroxide was added to the surfactant solution. Slowly, the organic mixture was added to the solution, while adjusting the height and speed of the homogenizer to obtain optimal homogenization. After all the organic mixture was added, the homogenizer was left to homogenize for 30 minutes. After the 30 minutes, excess solvent was evaporated by heating at 50° C. and under air flow. The evaporation process was stopped when ~25 ml of emulsion was left and the solution was stirred overnight in the fumehood to ensure complete ethyl acetate removal.

Example 2

Preparation of Styrene—n-Butyl Acrylate Latex (Latex B)

An emulsion comprised of polymer particles generated from the emulsion polymerization of styrene, n-butyl acrylate and beta-CEA was prepared as follows. A surfactant solution consisting of 0.605 g Dowfax 2A1 (anionic emulsifier) and 387 g deionized water was prepared by mixing for 10 minutes in a stainless steel holding tank. The holding tank was then purged with nitrogen for 5 minutes before transferring into the reactor. The reactor was then continuously purged with nitrogen while being stirred at 100 RPM. The reactor was then heated up to 80 degrees at a controlled rate, and held there. Separately, 6.1 g of ammonium persulfate initiator was dissolved in 30.2 g of de-ionized water.

Separately, the monomer emulsion was prepared in the following manner. 323 g of styrene, 83 g of butyl acrylate and 12.21 g of β-CEA, 2.85 g of 1-dodecanethiol, 1.42 g of ADOD, 8.04 g of Dowfax® 2A1 an anionic surfactant by The Dow Chemical Company, and 193 g of deionized water were mixed to form an emulsion. 1% of the above emulsion was then slowly fed into the reactor containing the aqueous surfactant phase at 80° C. to form the "seeds" while being purged with nitrogen. The initiator solution was then slowly charged into the reactor and after 10 minutes the rest of the emulsion was continuously fed in using a metering pump at a rate of 0.5 g/min. After 100 minutes, half of the monomer emulsion was been added to the reactor. At this time, 3.42 g of 1-dodecanethiol was stirred into the monomer emulsion, and the emulsion was continuously fed in at a rate of 0.5 g/min. Also, at this time, the reactor stirrer was increased to 350 RPM. Once all the monomer emulsion was charged into the main reactor, the temperature was held at 80° C. for an additional 2 hours to complete the reaction. Full cooling was then applied and the reactor temperature was reduced to 35° C. The product was collected into a holding tank. The particle size was calculated to be 180 nanometers. After drying the latex, the molecular properties were Mw=37,500 Mn=10,900 and the onset Tg was 55.0° C.

Example 3

Preparation of Ink Example 1 (Prophetic)

To a 100 mL amber glass bottle was added 1.12 g of Thetawet® FS8050—a surfactant available from Innovative Chemical technologies, 3.3 g of cyan 250 pigment an aqueous pigment dispersion available from Cabot®, and 50.73 g of water while mixing with a stir bar. The pH of the photochromic Latex (Latex A in Example 1) was adjusted to ~6.8 and added to the mixture. The latex container was rinsed with remaining water and added to the ink mixture. The mixture was stirred for about 30 minutes. 31.52 g of Sulfolane, a solvent available from Sigma Aldrich, was slowly added, and 3.33 ml of 2-pyrrolidone, a solvent available from Sigma Aldrich was added to the mixture. The mixture was then stirred for an additional 10 minutes and the pH adjusted to 7-8. The printing ink had a viscosity of from about 5 to about 20 cps, surface tension of from about 20 to about 40 mN/m, and a particle size of less than 600 nm for inkjet printing.

Example 4

Preparation of Ink Example 2 (Prophetic)

The ink Example 2 was prepared using the same procedure as the ink of Example 1 except that a second latex (Styrene butyl acrylate; Latex B) and a cyan colorant were also added.

TABLE I shows the amount of each component for the composition of the photochromic latex ink according to Examples 1-2.

TABLE I

| Component | | Ink Example 1 Relative parts (wt %) | Ink Example 2 Relative parts (wt %) |
|---|---|---|---|
| Latex A | Photochromic | 10.00 | 2.00 |
| Latex B | Styrene Butyl Acrylate | | 8.00 |
| Solvent #1 | Sulfolane (5% water) | 30.00 | 31.52 |
| Solvent #2 | 2-pyrrolidone | 3.33 | 3.33 |
| Surfactant | FS8050 | 1.12 | 1.12 |
| Viscosity Modifier | PEO (Mw 20K) | 0.72 | |
| Pigment | Cyan 250 | | 3.30 |
| | Water | 54.83 | 50.73 |
| | Total | 100.00 | 100.00 |

It will be appreciated that variations of the above-disclosed and other features and functions, or alternatives thereof, may be desirably combined into many other different systems or applications. Also that various, presently unforeseen or unanticipated, alternatives, modifications, variations or improvements therein may be subsequently made by those skilled in the art which are also intended to be encompassed by the following claims.

What is claimed is:

1. A photochromic aqueous based latex printing ink particle comprising:

an organic polymer;

optionally a colorant; and a photochromic compound that is:

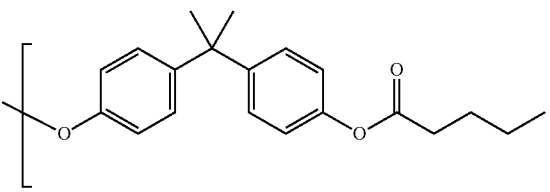

Compound #1

-continued

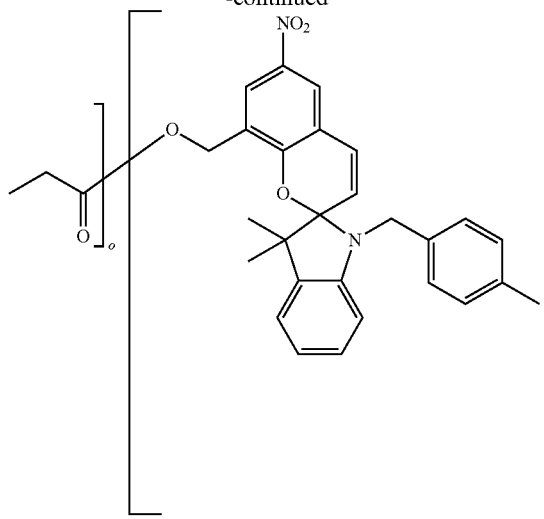

a binder that is:

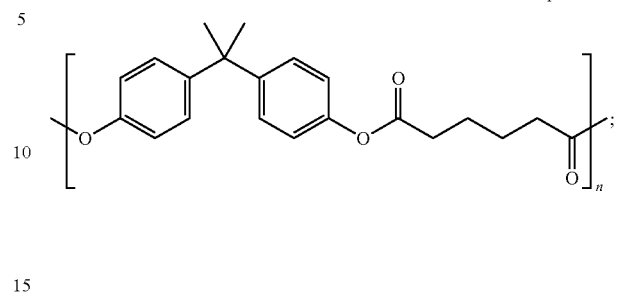

Compound # 2 wherein Compound #1 and Compound #2, in combination as a precursor to the latex printing ink particle, are in the form of a photochromic aqueous based latex particles; and wherein the photochromic aqueous based latex particle has a particle size from 20 nm to 600 nm.

2. The photochromic aqueous based latex printing ink particle according to claim 1, wherein the photochromic aqueous based latex particle has a particle size from 80 nm to 350 nm.

3. The photochromic aqueous based latex printing ink particle according to claim 1, wherein the photochromic aqueous based latex particle has a particle size from 90 nm to 300 nm.

4. The photochromic aqueous based latex printing ink particle according to claim 1, wherein the photochromic aqueous based latex particle comprises a core and a shell encasing the core.

5. The photochromic aqueous based latex printing ink particle according to claim 4, wherein the photochromic compound is present in the core and the colorant is present in the shell.

6. The photochromic aqueous based latex printing ink particle according to claim 1, wherein the photochromic aqueous based latex particle comprises a core having the photochromic compound, an inner shell encasing the core, and an outer shell encasing the inner shell.

7. A photochromic aqueous based latex printing ink composition, comprising:

a photochromic compound that is:

Compound #1

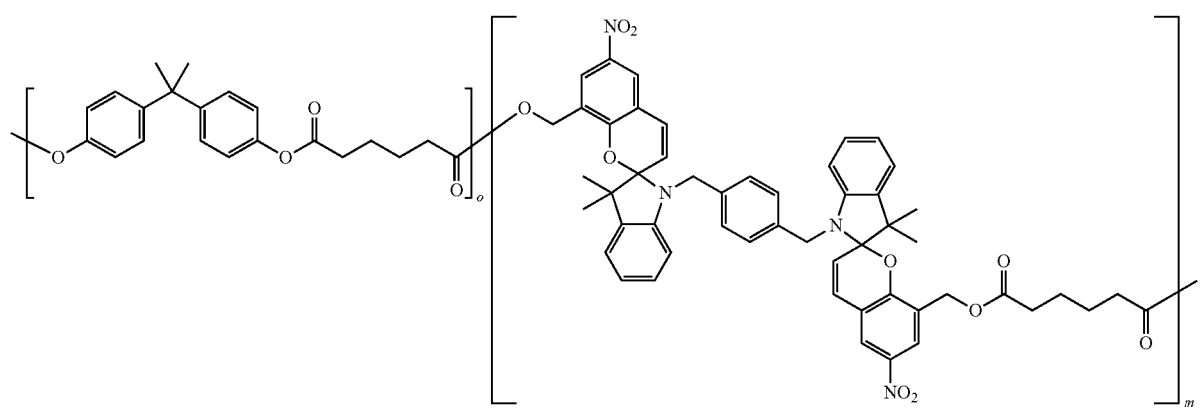

a binder that is:

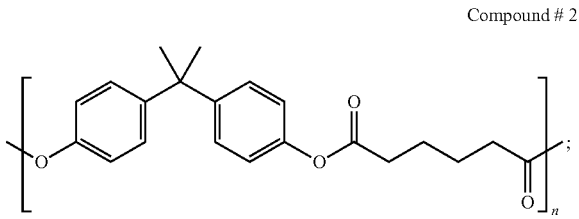

Compound #2 wherein Compound #1 and Compound #2, in combination as a precursor to the latex printing ink composition, are in the form of aqueous based latex particles;

wherein, at a jetting temperature from 25° C. to 70° C., the photochromic aqueous based latex printing ink composition has a surface tension from 15 mN/m to 50 mN/m, and a viscosity from 2 cPs to 20 cPs at a jetting temperature of between 25° C. to 70° C., and wherein the photochromic aqueous based latex printing ink composition further comprises a humectant in a concentration from 0.1 to 50.0 weight percent of total printing ink composition, a surfactant in a concentration from 0.01 to 10.0 weight percent of total printing ink composition, and a viscosity control additive in a concentration from 0.1 to 20.0 weight percent of total printing ink composition.

8. The photochromic aqueous based latex printing ink composition according to claim 7, wherein the photochromic latex printing ink composition has a surface tension of 15 mN/m to 45 mN/m.

9. The photochromic aqueous based latex printing ink composition according to claim 7, wherein the photochromic latex printing ink composition has a surface tension of 20 mN/m to 40 mN/m.

10. The photochromic aqueous based latex printing ink composition according to claim 7, wherein the photochromic latex printing ink composition has an average particle size of 20 nm to 600 nm.

11. The photochromic aqueous based latex printing ink composition according to claim 7, wherein the photochromic latex printing ink composition further comprises a permanent color dye.

12. The photochromic aqueous based latex printing ink composition according to claim 7, wherein the photochromic latex printing ink composition has a viscosity of 3 cPs to 15 cPs, at a jetting temperature of between 25° C. to 70 ° C.

13. The photochromic aqueous based latex printing ink composition according to claim 7, prepared by an emulsion process comprising adding a mixture including the photochromic compound and the binder to an aqueous surfactant solution.

14. The photochromic aqueous based latex printing ink composition according to claim 13, wherein the emulsion process further comprises heating the mixture of the photochromic compound and the binder prior to adding the mixture to the aqueous surfactant solution.

15. A photochromic aqueous based latex printing ink composition, comprising:

an organic polymer;

optionally a colorant; a photochromic compound that is:

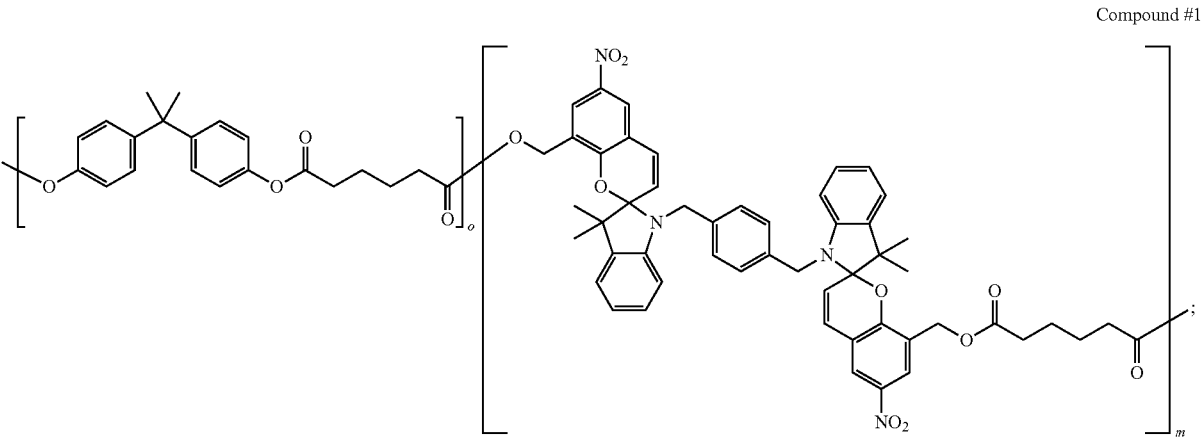

Compound #1 and a carrier;

wherein, at a jetting temperature from 25° C. to 70° C., the photochromic aqueous based latex printing ink composition has a viscosity from 2 cPs to 20 cPs, and wherein the photochromic aqueous based latex printing ink composition further comprises a humectant in a concentration from 0.1 to 50.0 weight percent of total printing ink composition, a surfactant in a concentration from 0.01 to 10.0 weight percent of total printing ink composition, and a viscosity control additive in a concentration from 0.1 to 20.0 weight percent of total printing ink composition.

16. The photochromic aqueous based latex printing ink composition according to claim 15, wherein the photochromic aqueous based latex printing ink composition has a viscosity of from 3 cPs to 15 cPs.

17. The photochromic aqueous based latex printing ink composition according to claim 15, wherein the photochromic aqueous based latex printing ink composition has a viscosity of from 4 cPs to 12 cPs.

18. The photochromic aqueous based latex printing ink composition according to claim 15, wherein the photochromic aqueous based latex printing ink composition has an average particle size from 20 nm to 600 nm.

19. The photochromic aqueous based latex printing ink composition according to claim 15, wherein the photochromic aqueous based latex printing ink composition has a surface tension from 15 mN/m to 50mN/m.

20. The photochromic aqueous based latex printing ink composition according to claim 15, wherein the photochromic aqueous based latex printing ink composition comprises a core, a shell enclosing the core, and the photochromic compound is present in the core.

* * * * *